(No Model.)
A. L. BANCROFT.
PRUNE PRICKER.
No. 534,776. Patented Feb. 26, 1895.
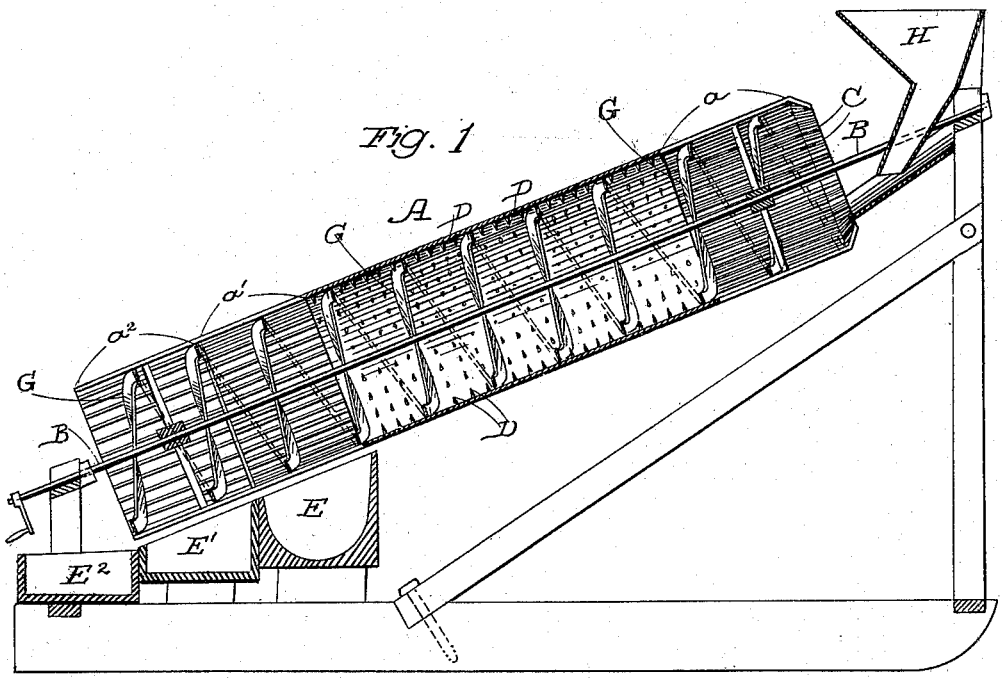
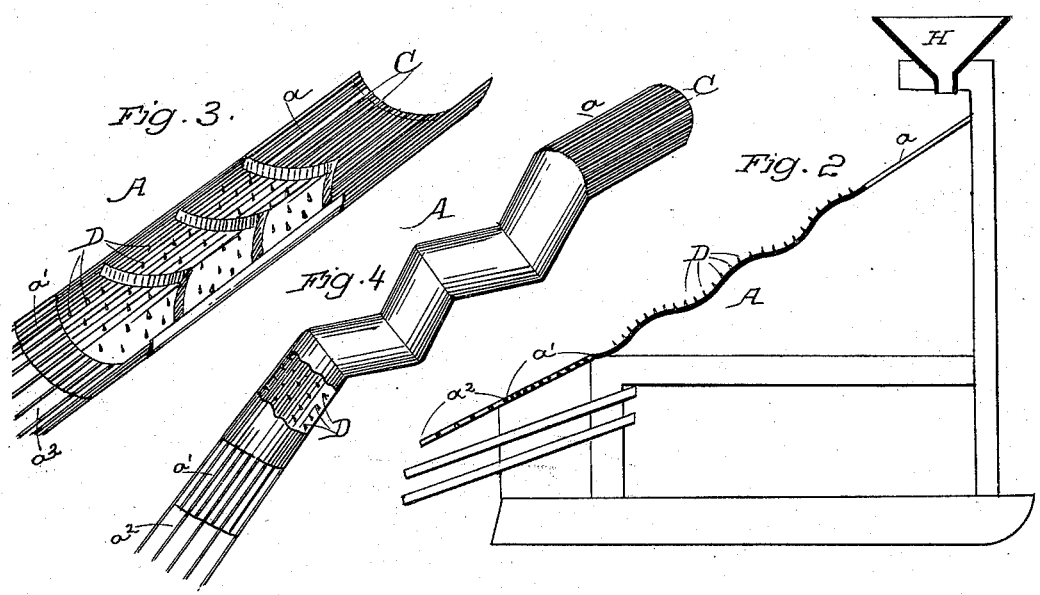
Witnesses:
Inventor,
Albert L. Bancroft
By Dewey & Co.
Attys

UNITED STATES PATENT OFFICE.

ALBERT L. BANCROFT, OF SAN FRANCISCO, CALIFORNIA.

PRUNE-PRICKER.

SPECIFICATION forming part of Letters Patent No. 534,776, dated February 26, 1895.

Application filed July 21, 1894. Serial No. 518,273. (No model.)

*To all whom it may concern:*

Be it known that I, ALBERT L. BANCROFT, a citizen of the United States, residing in the city and county of San Francisco, State of California, have invented an Improvement in Prune-Prickers; and I hereby declare the following to be a full, clear, and exact description of the same.

My invention relates to an apparatus which is designed to perforate the skins of prunes previous to drying the same and to dispense with the process of dipping in hot lye.

It consists in certain details of construction which will be more fully explained by reference to the accompanying drawings, in which—

Figure 1 is a longitudinal sectional view of my apparatus. Figs. 2, 3 and 4 are modifications of the same.

The object of my invention is to provide an automatically operating device through which the prunes pass by gravitation and are allowed to alternately fall a short distance and then be arrested upon a surface provided with perforating points, so that the force of the impact will perforate the skins of the prunes. In carrying out my invention I have shown various forms by which this result is produced.

In Fig. 1, I have shown a cylinder which may be of any suitable size. I have found that one about eight feet in length by about twenty inches in diameter is a convenient size. This cylinder is made of metal and is mounted upon a shaft B extending from end to end and having its ends supported in suitable journal-boxes so that it may be turned by a crank or other suitable or convenient power. The cylinder has its length divided into a first portion $a$ which may be of any suitable length, and which has open slots or channels C formed for about one foot of its circumference upon one side, either by bars or wires running lengthwise of the machine, and properly secured about three-eighths or one-half an inch apart. In some cases it may be found desirable to allow this grated portion to extend around the whole or a larger part of the circumference of the cylinder at some portion of its length. These openings or spaces serve for the escape of any dirt or leaves which may have been gathered with the fruit. The remainder of the circumference of this part of the apparatus is closed, preferably formed of metal and thickly studded with sharp points D projecting inwardly and having a length sufficient to perforate the skins of the fruit as it strikes them. The next section of the length of the cylinder $a'$ is made of wires or bars running longitudinally and from three-fourths to one inch apart, and another one and one-fourth feet ($a^2$) is similarly made of wires or bars from one to one and one-half inches apart. These latter divisions serve as graders, through the first of which the smallest fruit falls into a box or receiver E beneath, and through the second of which the next size larger will fall into a similar box. Any fruit which is too large to pass through the openings in the latter part, will pass out at the end and be delivered into a corresponding box or receiver. These receivers are so arranged that their contents may be delivered into trays or boxes.

Around the interior of the entire length of the cylinder is fixed a spiral flange G of any suitable height, and forming about one turn around the interior of the cylinder for each foot of its length. This flange may be used if the cylinder stands at a considerable inclination, but if the angle is small so that the fruit does not advance too rapidly, the flange may be dispensed with.

The operation of this device will then be as follows: Fruit is delivered into the upper end of the cylinder which is inclined as shown through a hopper H, and falling into the cylinder A, the latter is rotated at a proper rate of speed. The prunes are lifted up a little on one side by their frictional contact with the interior of the cylinder and when they reach a point sufficiently above the bottom, they will fall over by gravitation, and striking upon the sharp needle points fixed on the interior of the cylinder, the skins will be perforated at the point of contact with the needles. The continued rotation of the cylinder, repeatedly lifts and drops the fruit, and each fall, suddenly arresting it upon the points of the needles, is sufficient to cause a perforation. Whenever that portion of the cylinder which is formed with the open slots or channels, arrives at the lower part any dirt, leaves, or smaller sticks which have been gathered with the fruit, will fall through, and during the several rotations which take place before the fruit reaches the lower end of this part of the cylinder, the dirt and leaves will have all been separated from the fruit, and the latter by its repeated contact with the sharp points will have been properly perforated. As the rotation of the cylinder continues, and the fruit passes over the second section $a'$ formed of the longitudinal bars or wires, all the small fruit will fall through as previously described, the larger fruit moving on to the third section $a^2$ where the wires are a greater distance apart, and another separation takes place, only the largest and finest portion passing this part of the apparatus and being delivered from the lower end of the cylinder.

In Fig. 2 I show the same method and result achieved without the rotation of the surface containing the points. In this case the surface is made undulatory, as shown, and at such an incline that the fruit delivered upon the upper end from the hopper H will roll down the incline, passing first over the upper part of the first undulation where it moves a little more slowly, and then drops rapidly down through the depression next below the upper ridge of the undulation, and it strikes upon the projecting points or pins at the back of the second undulation which serve to perforate the skins at the point where the fruit strikes the pins. It again rolls on over the next undulation and again falls upon the pins next below, and in this manner the whole surface of the fruit will be perforated before it reaches the discharge. The bottom is made, as before described, with slots for the escape of dirt, &c., and may also be provided with grading slots in the same manner. At the lower end the fruit is delivered upon the trays or boxes which, being gradually filled as they are withdrawn, are in readiness to be taken to the drying place as soon as they are filled.

Fig. 3 is a modification in which the inclined chute A has a semi-circular bottom, and has V-shaped flanges arranged upon it, with the apex or point located centrally in the bottom of the chute and presented toward the receiving end thereof. In this case these flanges occupy the position of the spirals G in the cylindrical construction. As they receive the fruit rolling down the incline, their diverging sides cause it to move up the curved sides of the chute until it passes beyond or over the separated ends of the flanges, and thence falls down toward the center of the chute which is armed with the sharp needles as before described. Each time the fruit falls upon these needles it is perforated, and is then immediately raised up by following the diverging flanges to fall again beyond this set and perforate at some new point until the whole surface of the fruit has been effectually punctured.

In Fig. 4, the same effect is produced in a manner similar to the undulatory arrangement shown in Fig. 2, the difference being that in Fig. 2, the undulations are curvilinear, while in Fig. 4 they are shown in straight lines meeting at an obtuse angle. In each case the fruit falls with considerable rapidity down a portion of the chute, and is then arrested against another portion which is provided with the perforating pins.

Having thus described my invention, what I claim as new, and desire to secure by Letters Patent, is—

1. A prune perforator consisting of an inclined passage having a variety of inclination with intermediate obstructions, whereby fruit passing through or along said passage is caused to rise and fall in vertical planes, falling rapidly at one point in its progress and being arrested at another portion, said latter portion being provided with the perforating points on its inner surface.

2. A prune perforator consisting of an inclined chute through which the fruit falls by gravity, and having channels or openings for the discharge of dirt and leaves, said chute having its surface formed with a variety of inclination with intermediate obstructing portions armed with sharp points, whereby the fruit is caused to rise and fall in vertical planes alternately slowly and rapidly, so that its fall upon the sharpened points will cause its arrest with sufficient shock to perforate the skins.

3. A prune perforator consisting of an inclined rotary chute through which the fruit is adapted to pass by gravitation, and the rate of progress through the chute is regulated, and the fruit is alternately lifted up the side and allowed to drop into the bottom of the chute, inwardly projecting points whereby the skins of the fruit are perforated by the fall, and channels or openings through one portion of the tube for the discharge of dirt and leaves.

4. A prune perforator consisting of a rotary tube through which the fruit is adapted to pass, a flange extending through the interior of the tube serving to regulate the rate of passage of the fruit, and to lift it and allow it to fall by gravitation upon perforating points fixed upon the interior surface, longitudinal channels through which dirt and leaves are allowed to escape, and sections formed with longitudinal rods or bars separated by intervals of different width whereby the small fruit is separated from the larger and graded.

In witness whereof I have hereunto set my hand.

ALBERT L. BANCROFT.

Witnesses:
J. W. KEYS,
FRANK D. CULVER.